United States Patent
Murakami et al.

[11] Patent Number: 5,582,891
[45] Date of Patent: Dec. 10, 1996

[54] OPTICAL DISK SUBSTRATE WITH LAND PLANES OF UNIFORM HEIGHT

[75] Inventors: Motoyoshi Murakami; Masahiro Birukawa, both of Hirakata; Yoshihiko Kudoh, Yawata, all of Japan

[73] Assignee: Matsushita Electric Industrial Co., Ltd., Japan

[21] Appl. No.: 76,848

[22] Filed: Jun. 15, 1993

[30] Foreign Application Priority Data

Jun. 15, 1992 [JP] Japan ..................... 4-154646

[51] Int. Cl.⁶ .................................................. B32B 3/00
[52] U.S. Cl. ............... 428/64.1; 428/64.2; 428/64.4; 428/64.8; 428/913; 430/270.1; 430/270.11; 430/270.12; 430/270.14; 430/945; 430/496; 369/275.1; 369/275.4; 369/277; 369/278; 369/283
[58] Field of Search .................... 428/64, 65, 913, 428/64.1, 64.2, 64.4, 64.8; 369/275.1, 275.4, 277, 278, 283; 430/270, 495, 945, 270.1, 270.11, 270.12, 270.14

[56] References Cited

U.S. PATENT DOCUMENTS

| | | | |
|---|---|---|---|
| 4,947,384 | 8/1990 | Suzuki | 369/279 |
| 4,956,214 | 9/1990 | Imataki | 428/64 |
| 5,017,414 | 5/1991 | Gregg | 428/64 |
| 5,210,738 | 5/1993 | Iwata . | |
| 5,344,683 | 9/1994 | Shimizu | 428/64 |

FOREIGN PATENT DOCUMENTS

| | | |
|---|---|---|
| 3-254436 | 11/1991 | Japan . |
| 3-290839 | 12/1991 | Japan . |

*Primary Examiner*—Patrick Ryan
*Assistant Examiner*—Elizabeth Evans
*Attorney, Agent, or Firm*—Wenderoth, Lind & Ponack

[57] ABSTRACT

A method of making a stamper uses a photoresist disk cut by the application of a laser beam on the land planes thereof, or a stamper which is different in depth between the land plane on the internal peripheral side with respect to the prepit portion and the land plane on the external peripheral side. A method of making an optical disk substrate includes the steps of using a stamper, and molding a transparent plastic material with an injection molding method. A stamper capable of sufficiently transferring the prepits and guide grooves on the optical disk substrate with the correction of right and left inequality of the prepits, and the method of making it, and a superior optical disk substrate and a method of making it can be realized.

14 Claims, 14 Drawing Sheets

OPTICAL DISK SUBSTRATE WITH LAND PLANES OF UNIFORM HEIGHT

BACKGROUND OF THE INVENTION

The present invention generally relates to an optical disk substrate of an optical recording medium for effecting an information recording, reproducing or erasing operation using an optical means such as a laser beam or the like.

The construction of a conventional optical disk is basically shown in FIGS. 16(a) and 16(b). A recording film is provided through a protective layer on a disk substrate, and further, a protective film is provided on the recording film through an intermediate dielectric film.

In order to effect recording and erasing operations in a magneto-optical recording medium using a perpendicular magnetization film having a magneto-optical effect in the recording film, the recording film is locally heated to temperatures small in coercive force of compensation temperatures or to approximately the curie temperature or higher by the application of laser beams so as to lower the coercive force of the recording film in the application portion for enabling the magnetization of the recording film in the direction of the external magnetic field (so called thermomagnetic recording). In order to effect the reproduction of the recording signal, laser beams which have a lower intensity than the laser beams used during recording or erasing are used so as to detect photons with an analyzer, as change in optical intensity, a situation where the polarization plane of the reflected light or transmitted light is rotating (which is caused in accordance with the magneto-optical effect of the so called Kerr effect and Faraday effect) in accordance with the recording condition of the recording film, namely, the magnetization direction. A magnetic material having a perpendicular magnetic anisotropy is used for the recording film of the magneto-optical recording medium in order to effect a high density recording operation with interference among the inversely directed magnetization being made smaller.

Optical beams are applied on the medium likewise, in the case of an optical disk using a phase-change (pc) optical recording medium, having an organic material for the recording film, so as to cause a local temperature rise or chemical change because of optical absorption for effecting the recording operation. The signal is reproduced by the application of optical beams of different intensity or wavelength from those used during recording in the local change in the medium caused by the recording operation so as to detect the reflected light or the transmitted light.

In the conventional optical disk, an optical disk substrate provided with guide grooves for the tracking guide of the optical spots or prepits is used so that high density recording and random access are realized.

In the molding operation of the actual optical disk substrate, the intervals between the tracking grooves or prepits are close so that the transferring operation from the stamper to the disk substrate is insufficient. FIG. 16(b) is a view showing the appearance of the resin material of the conventional stamper and disk substrate during manufacture. FIGS. 17(a) and 17(b) are views showing the relationship between the prepits of the stamper and the land planes. The land planes to be described hereinafter are regions shown with oblique lines adjacent to the prepits 53, of the faces disposed between the prepits 53 and the grooves 52 as shown in FIG. 17(a), or of the faces disposed with tracks formed by the prepits 72 as shown in the stamper of the optical disk of the ROM type of FIG. 17(b).

In such a stamper as shown in FIG. 16(b), the flowing condition of the molten resin is shown by arrows when the plastic resin material molten such as polycarbonate or the like is injected from the substrate center A side, because the depth of the prepits 83 is set to be approximately x/4n with respect to the laser wavelength x during the reading time and the refractive index n of the substrate. Although the resin material is likely to flow to the land 88 where the prepits of stamper on the internal peripheral side are not formed with respect to the prepits 83 from the relationship between the viscosity of the resin material and the track pitch, the resin material is flowed sufficiently no longer to the land 89 on the external peripheral side.

Also, the difference in depth between the land 84 on the internal peripheral side and the land 85 on the external peripheral side of the substrate molded with respect to the prepits 83 of the disk substrate 81 becomes larger when the track pitch becomes smaller. Especially the transferring operation of the prepits and the adjacent land planes become difficult to effect when the track pitch is made smaller for high recording density. Errors are caused, because the discrimination of the sectors and the addresses cannot be effected when the servo characteristics and the recording and reproducing characteristics during the recording and reproducing time are lowered or the transferring operation of the prepits is insufficient. When the transferring operation is forced to effect on the land plane on the external peripheral side with respect to the prepits with the compressing pressure at the injection time being made larger, the tilt or the eccentric acceleration becomes larger, thus causing a problem in the mechanical characteristics.

SUMMARY OF THE INVENTION

Accordingly, the present invention has been developed with a view to substantially eliminating the above discussed drawbacks inherent in the prior art and has for its essential object to provide optical disk substrates.

The present invention may be effected by providing an optical disk substrate made of a transparent plastic material, comprising: tracking guide grooves disposed at regular intervals in a radial direction with a track pitch of a first predetermined value, said tracking guide grooves being disposed between adjacent grooves formed in a land plane; and prepit concave portions having their bottom faces formed substantially at the same level in depth in the land plane; wherein the land plane has a uniform surface in height and the differences in height thereof with respect to the level of the bottom faces of the prepit concave portions are within a second predetermined value.

The present invention may also be effected by providing an optical disk substrate made of a transparent plastic material, comprising: prepit concave portions disposed at regular intervals in a radial direction with a track pitch of a first predetermined value, said prepit concave portions being disposed between adjacent concave portions formed in a land plane, said prepit concave portions having their bottom faces formed substantially at the same level in depth in the land plane; wherein the land plane has a uniform surface in height and the differences in height thereof with respect to the level of the bottom faces of the prepit concave portions are within a second predetermined value.

The optical disk substrate uses polycarbonate, polyolefin, or acryl as transparent plastic materials.

BRIEF DESCRIPTION OF THE DRAWINGS

FIG. 4(a) shows a plane view of the stamper, and FIG. 4(b) shows a cross-sectional view thereof;

FIG. 16(a) is a view showing one construction of the conventional optical disk, and FIG. 16(b) is a view showing the state of the resin material at the time of making the conventional stamper and the disc substrate;

FIG. 17(a) is a stamper provided with prepits and grooves, and FIG. 17(b) is a stamper constructed with the prepits.

DESCRIPTION OF THE PREFERRED EMBODIMENTS

Figure 1:
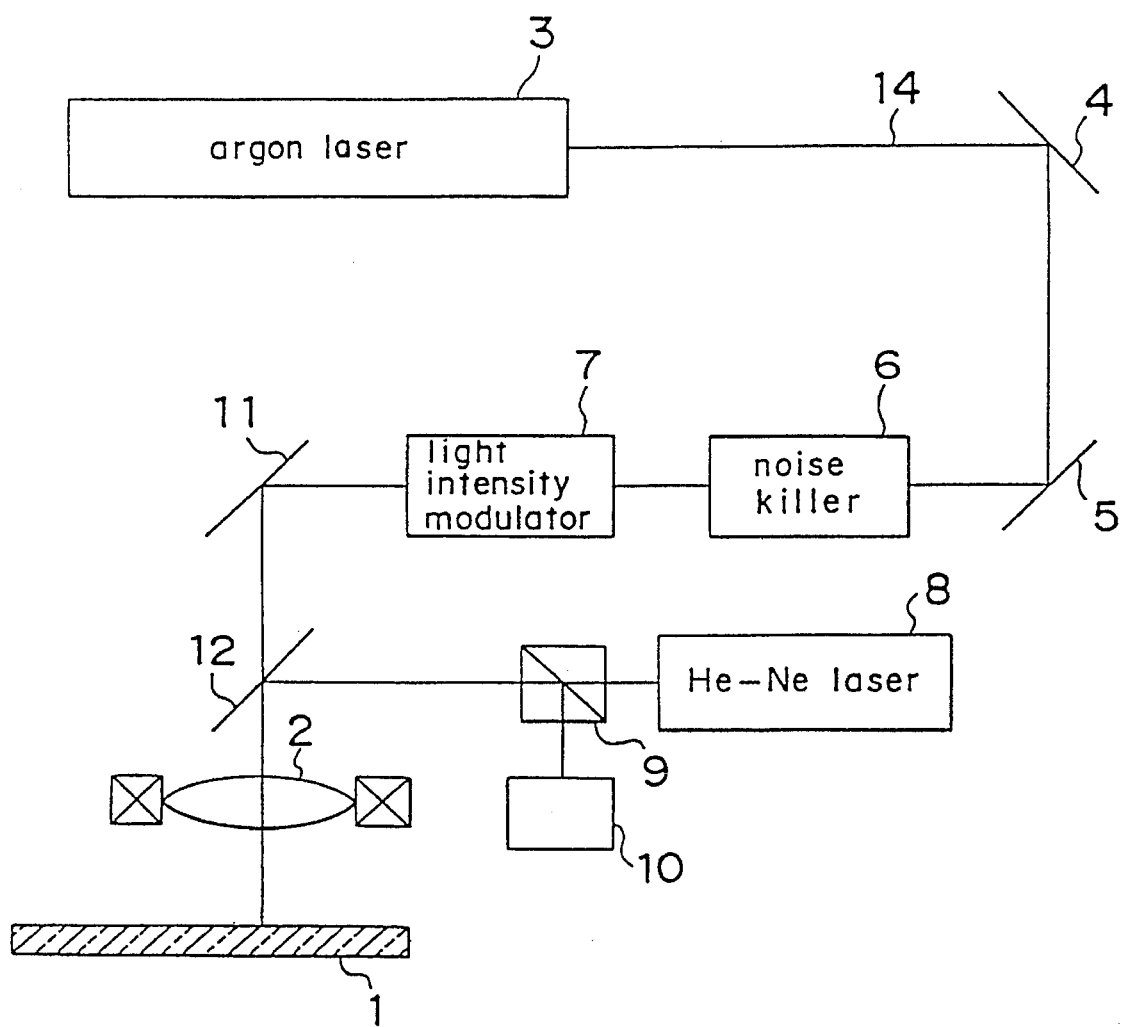
FIG. 1 is a block diagram of a laser cutting apparatus for making a stamper in accordance with a first embodiment of the present invention.

Before the description of the present invention proceeds, it is to be noted that like parts are designated by like reference numerals throughout the accompanying drawings.

A method of making a stamper in one embodiment of the present invention will be described hereinafter with reference to the drawings.

Figure 3:
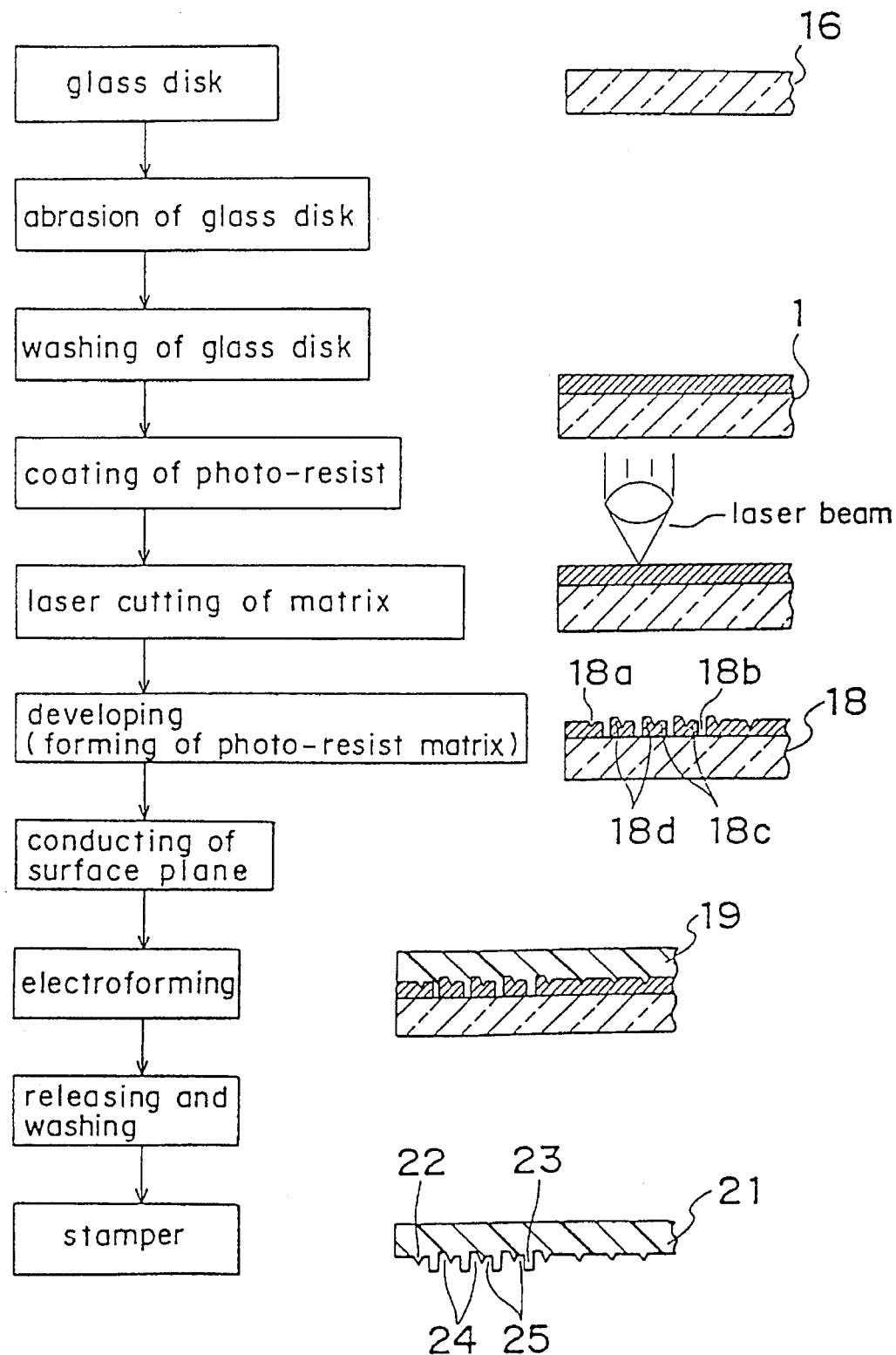
FIG. 3 is a step block diagram of a stamper making method in accordance with the first and second embodiments of the present invention.

FIG. 1 is a block diagram showing a laser cutting apparatus for making a stamper in accordance with a first embodiment of the present invention. FIG. 3 shows a procedure of steps of making a stamper. Referring to FIG. 1, element 3 is argon laser; element 1 is a glass disk with photoresist applied thereto; element 2 is a focusing lens for focusing the beam from the argon laser 3 on the photoresist disk 1; elements 4, 5, and 11 are mirrors; element 6 is a noise killer for removing noise due to laser output variations; element 7 is a light beam intensity modulator; element 8 is a He-Ne laser used for focus control; elements 9 and 12 are polarization beam splatters, and element 10 is a sensor for generating a focus error signal.

A method of making a stamper in accordance with the present invention is described hereinafter. As shown in FIG. 3, the photoresist disk 1 is made by coating by a spinner after a positive type of photoresist is dropped on the abrasive worked and washed glass disk. A method of cutting the photoresist disk 1 comprises the steps of directing the laser beam 14 from the argon laser 3 of the laser cutting apparatus through the mirrors 4 and 5, removing noise with the noise killer 6, setting the intensity with the beam intensity modulator 7, and thereafter directing the beam through a mirror 11 and a polarization beam splitter 12, and focusing the beam on the photoresist disk 1 by the focusing lens 2, thereby effecting a cutting operation. The track pitch is 1.5 μm. In the case of the cutting of the tracking guide groove 18a, the laser beam intensity of the argon laser 3 is set so that the groove depth may become 65 nm so as to focus onto the photoresist disk 1. The laser beam intensity is set so that the depth of the prepit may become 130 nm when the prepit portion 18b is cut. The laser beam intensity of 30% in the case of the cutting of the guide grove is set on the land face adjacent on the internal peripheral side of the prepit portion, and the laser beam is applied to the land place 18c in a position of approximately 0.4 μm (the center of the prepit and the guide groove) on the internal peripheral side with respect to the prepit.

Figure 17A:
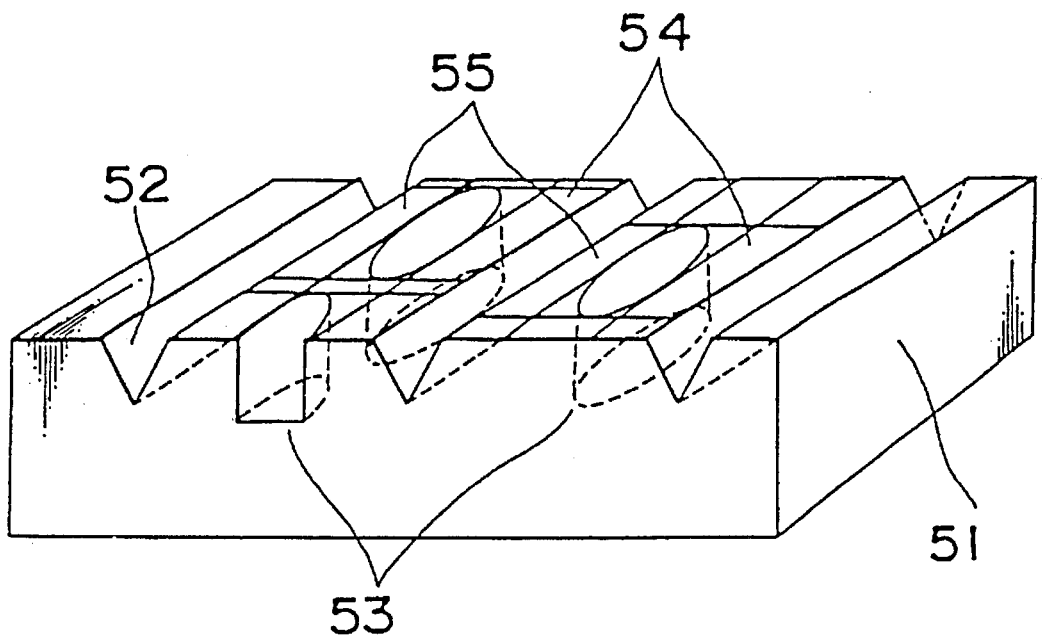
FIGS. 17(a)–17(b) are views showing the relationship between the respective prepits and the land plane.

The land face 18c on the internal peripheral side with respect to the prepit portion 18b of the photoresist disk 1 is lower than a land plane 18d on the external peripheral side, because the photoresist disk 1 cut in this manner is melted in an exposed portion when developed. A conductive film of nickel is formed on the resist layer by sputtering on the developed disk 18, and is conducted on the surfaces. An energizing operation is effected in a sulfamine acid nickel bath, and nickel 19 is separated onto a glass disk so as to effect an electrotyping operation; a coming off processing operation from the glass disk, and a washing operation are effected for making a stamper. The stamper 21 made in this manner is composed so that the land plane 24 on the external peripheral side is deeper than the land plane 25 on the internal peripheral side with respect to the prepit portion 23, because the photoresist disk 18 and unevenness are inverted. The land planes are either of regions 54 and 55 adjacent to the prepits of the track disposed by the prepit 53 and the guide groove 52 of the disk substrate 51, as shown by oblique line portions of FIG. 17(a), or regions on the stamper 21 corresponding to the land planes on the disk substrate.

Figure 4A:
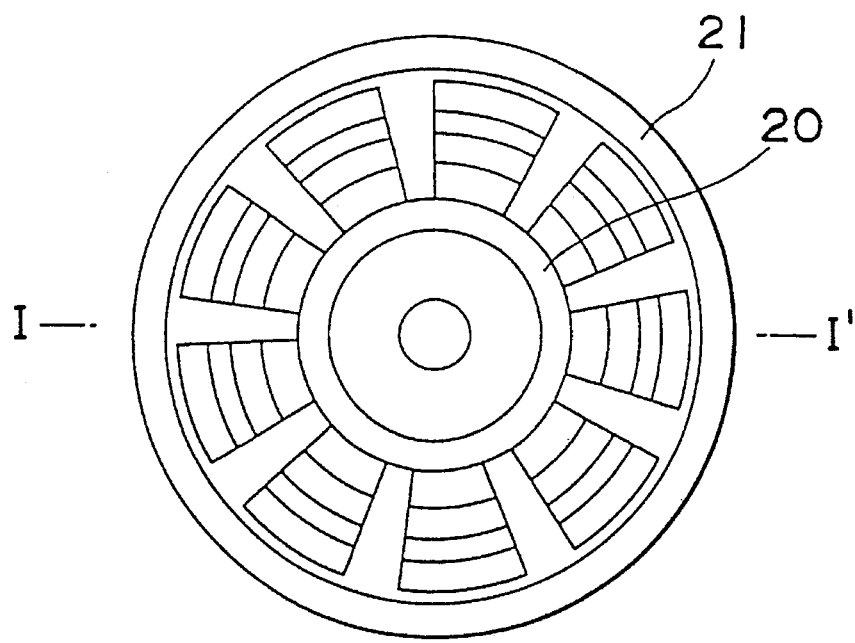
FIGS. 4(a)–4(b) are stamper construction views in accordance with the first and second embodiments of the present invention.
Figure 4B:
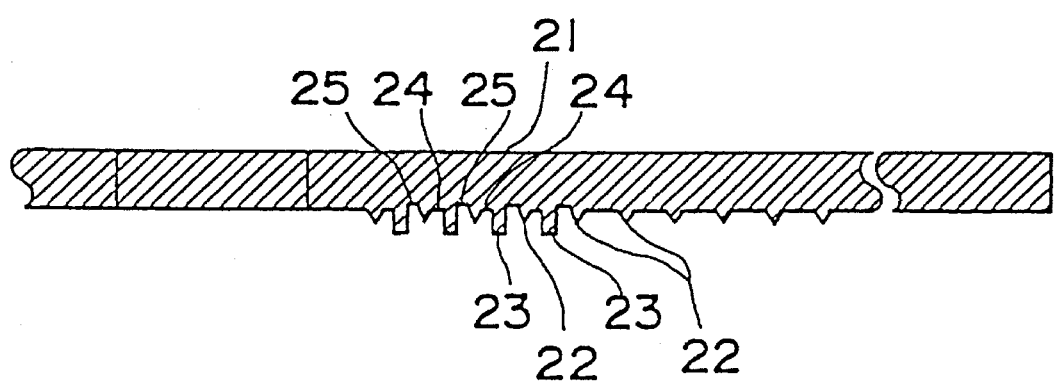

FIGS. 4(a)–4(b) are construction views of a stamper in accordance with an embodiment of the present invention. In FIGS. 4(a)–4(b), element 21 is a stamper; element 22 is a guide groove for a tracking guide formed in a spiral shape with 1.5 µm pitch; element 23 is a signal string of the prepits; element 24 is a land plane on the external peripheral side with respect to the prepit 22; and element 25 is a land plane on the internal peripheral side. The stamper of the present embodiment can realize a stamper 21 where the land plane 24 on the external peripheral side is deeper than the land plane 25 on the internal peripheral side with respect to the prepits 23. In the stamper 21 in the present embodiment, the depth from the prepit 23 to the land plane 24 on the external peripheral side is set to 150 nm, and the depth to the land plane on the internal peripheral side i set to 130 nm. The depth of the guide groove 16 for tracking guide is 60 nm.

The stamper is adapted to set deeper by 20 nm in depth from the land plane on the external peripheral side than the depth from the land plane on the internal peripheral side with respect to the prepit when the stamper for making the optical disk substrate of the present embodiment made in this manner is used. When the disk substrate is made by the injection molding method of the polycarbonate resin, the molten resin is likely to enter the land plane on the external side with respect to the prepit and the molded substrate can have the land plane on the internal peripheral side adjacent in the radical direction and the land plane on the external peripheral side made approximately as high with respect to the prepit.

The first embodiment of the present invention is a method of making a stamper using a photoresist disk for focusing the laser beam with the focusing lens so as to effect a laser cutting operation, and effecting developing, surface conduction, electrotyping, and coming off washing operations. The method is a method of making a stamper including focusing the laser beams on the photoresist disk 1 with a focusing lens 2, the laser beam having a laser beam intensity of 30% in a case of the cutting operation of the guide groove on the land plane in a position which is approximately 0.4 µm on the inner peripheral side with respect to the prepit. The laser beam intensity applied to the land portion has only to be 20% through 50% with respect to the laser beam intensity applied to the guide grooves in accordance with the molding conditions of the basic plate.

In the first embodiment of the present invention, the method of making a stamper comprises the steps of: applying a laser beam to the land plane on the internal peripheral side at a position which is approximately 0.4 µm with respect to the prepit, the laser beam having a 30% intensity in the cutting operation of the prepit; using a photoresist disk where the land plane on the internal peripheral side with respect to the prepit is lower than the land plane on the external side. When the track pitch is set smaller, the position of the land plane and the intensity of projecting for applying the laser beam have only to be set in accordance with the size of the track pitch.

Figure 2A:
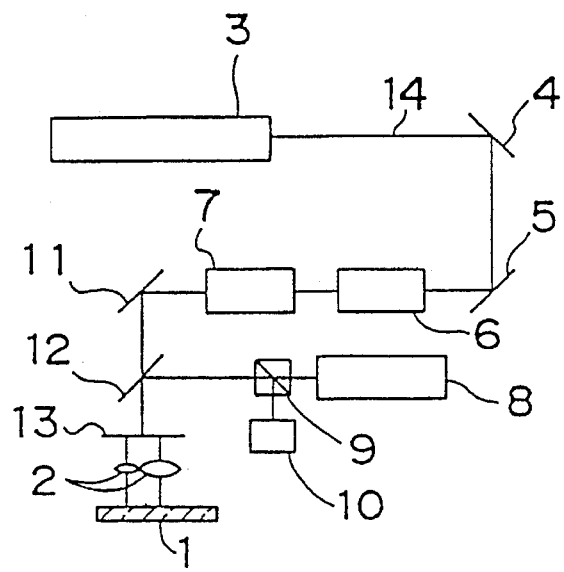
FIG. 2(a) is a block diagram of a laser cutting apparatus for making a stamper in accordance with a second embodiment of the present invention.
Figure 2B:
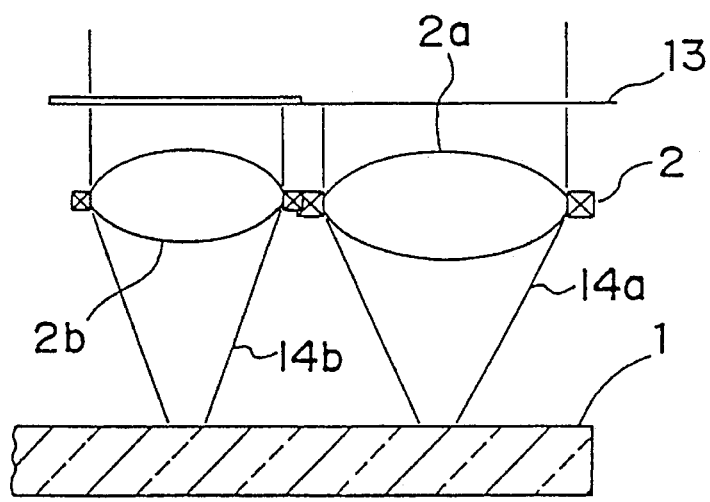
FIG. 2(b) is an enlarged view of a focusing lens portion.

FIG. 2(a) is a construction view of a laser cutting apparatus; FIG. 2(b) is an enlarged view of a focusing lens portion for making a stamper in accordance with a second embodiment of the present invention. The step procedure of a method of making a stamper is shown in FIG. 3 as in the first embodiment. In the present embodiment, the x/4 plate 13 for making two-divisions of the laser beam spot is disposed immediately before the focusing lens.

In FIG. 2(a), element 3 is an argon laser; element 1 is a recording disk having a photoresist thereon; element 2 is a focusing lens for focusing the beam from an argon laser 3 onto the photoresist disk 1; elements 4, 5, and 11 are mirrors; element 6 is a noise killer removing noise caused by the laser output variations; element 7 is a light beam intensity modulator; element 8 is a He-Ne laser used for focus control; elements 9 and 12 are polarization beam splitters; element 10 is a sensor for generating a focus error signal; element 13 is a x/4 plate for two-dividing the laser beam spot.

A method of cutting the photoresist disk 1 in a method of making a stamper in accordance with the present embodiment is described hereinafter. The laser beam 14 of the argon laser 3 of the laser cutting apparatus is directed by mirrors 4 and 5 and passed through the noise killer 6 so as to remove the noise, and has its intensity set by the optical intensity modulator 7, thereafter being directed by the mirror 11 and passing through the polarization beam splitter 12 so as to focus on the photoresist disk 1 with the focusing lens 2 for effecting a cutting operation.

Figure 2C:
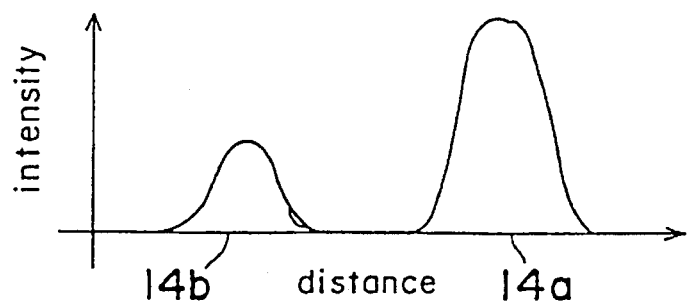
FIG. 2(c) is a view showing the laser beam intensity divided by a x/4 plate.

In the cutting apparatus of the present embodiment, the laser beam spot is divided in two by the x/4 plate 13 as shown in FIG. 2(b), and the prepit is divided into a laser beam spot 14a for cutting the prepit and a laser beam spot 14b to be applied upon the land plane adjacent to the inner peripheral side with respect to the prepit for focusing on the photoresist disk 1 with focusing lens 2a and 2b. The intensity is different as shown in FIG. 2(c). In the application upon the land planes, the laser beam having an intensity of 20% in the case of application upon the prepit is applied on the spots of land plane of 0.3 µm at the internal side of the prepit. In the case of the cutting operation of the tracking grooves, the x/4 plate 13 is not used as before. The laser beam of the argon laser 3 is focused as is on the photoresist disk 1.

The photoresist disk 1 cut in this manner is made so that the land plate 18c on the internal peripheral side is lower than the land plate 18d on the external peripheral side with respect to the prepit portion 18b of the photoresist disk 1. The conductive film of nickel is formed on the resist layer with a sputtering operation and is made conductive on the surfaces on the developed disk 18. An energizing operation is effected in a sulfamine acid nickel bath so as to separate the nickel 19 on the glass disk for effecting an electrotyping operation. The stamper is made by the coming off processing operation from the glass disk, and the washing operation. The stamper 21 made in this manner is made so that the land plane 24 on the external peripheral side is deeper than the land plane 25 on the internal peripheral side with respect to the prepit portion 23 for reversing the photoresist disk 18 and the unevenness.

The second embodiment of the present invention is a method of making a stamper by focusing the laser beam with the focusing lens so as to use the photoresist disk for effecting a laser cutting operation, of effecting developing, surface conduction, electrotyping, and coming off washing operations. By the x/4 plate 13, the laser beam is divided into a laser beam spot for cutting a prepit portion and a laser beam spot for applying to the adjacent land portion on the internal peripheral side. The method is a method of making a stamper using a photoresist disk where the land plane on the internal peripheral side is lower than the land plane on the external peripheral side with respect to the prepit using a laser beam spot having a 20% intensity of the beam applied to the prepit portion in the case of the application of the beam to the land portion. The divided laser intensity applied to the land plane has only to be 10% through 40% in intensity with respect to the laser beam intensity applied to the prepit in accordance with the molding conditions of the substrate.

In the second embodiment of the present invention, a method of making a stamper comprises the steps of: applying a laser beam having a laser beam intensity of 20% to the land plane of approximately 0.3 μm on the internal peripheral side with respect to the prepit in a case where the cutting operation of the prepit is effected; and using a photoresist disk where the land plane on the internal peripheral side is lower than the land plane on the external peripheral side with respect to the prepit. When the track pitch is set smaller, the position and the intensity of the laser beam to be applied upon the land plane may be set in accordance with the size of the track pitch.

In a method of making a stamper by the second embodiment of the present invention, a stamper of the construction shown in FIGS. 4(a)–4(b) can be made. As shown in FIGS. 4(a)–4(b), the stamper of the present embodiment is a stamper where the land plane 24 on the external peripheral side is deeper than the land plane 25 on the internal side with respect to the prepit 23. The depth from the prepit 23 to the land plane 24 on the external peripheral side is 150 nm, and the depth to the land plane 25 on the internal peripheral side is set to 130 nm. The depth of the groove 16 for the tracking guide is 60 nm.

The depth from the land plane on the external peripheral side is set deeper by 20 nm than the depth from the land plane on the internal peripheral side with respect to the prepit when the stamper for making the optical disk substrate in the present embodiment made in this manner is used. When the disk substrate is made with an injection molding method of a polycarbonate resin, the molten resin is likely to enter the external peripheral side with respect to the prepit, the molded substrate can have a land plane on the internal peripheral side and a land plane on the external peripheral side made as approximately high as each other with respect to the prepit.

In a stamper in accordance with an embodiment of the present invention, the land plane on the external peripheral side with respect to the prepit is set deeper by 20 nm than the land plane on the internal side. A stamper of 5 nm through 50 nm only has to be made with a depth difference between the land plane on the external peripheral side with respect to the prepit and the land plane on the internal peripheral side in accordance with the size of the track pitch of the optical disk substrate, and the molding conditions.

The stamper in accordance with the embodiment the present invention is a stamper for making an optical disk substrate adapted to be deeper in prepit than in the groove. It is a stamper where the land plane on the external peripheral side with respect to the prepit is set deeper than the land-plane on the internal peripheral side. In the stamper for making an optical disk substrate adapted to be deeper in the groove than in the prepit, the stamper has only to be a stamper where the land plane on the internal peripheral side is deeper than the land plane on the external peripheral side with respect to the prepit.

A stamper and a making method of it in accordance with a third embodiment of the present invention is described hereinafter with reference to the drawings. A stamper in accordance with the third embodiment of the present invention is a stamper for molding an optical disk substrate formed with a ROM type of prepit only as shown in the construction view of the stamper of FIGS. 6(a)–6(b).

Figure 5:
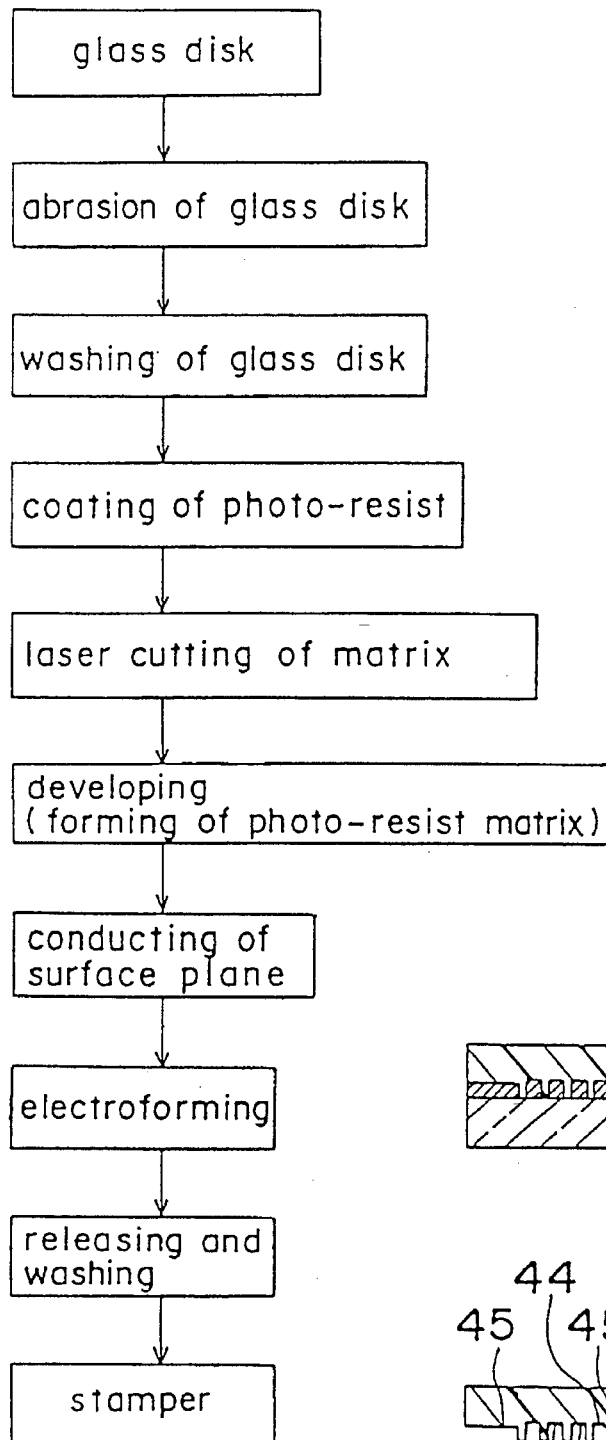
FIG. 5 is a step block diagram of a stamper making method in accordance with a third embodiment of the present invention.
Figure 5:
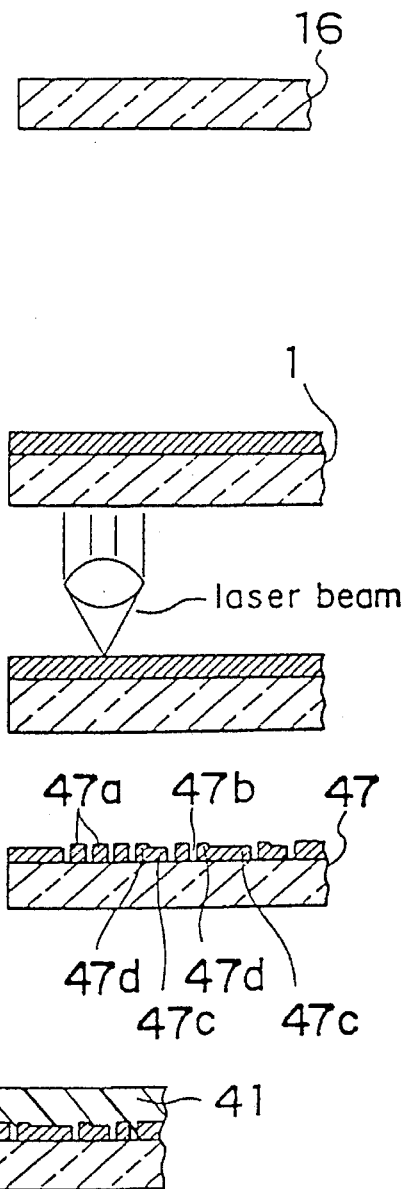
Figure 5:
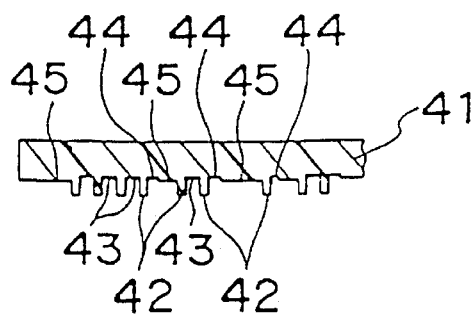

The construction view of a laser cutting apparatus for making a stamper in accordance with the third embodiment of the present invention is shown in FIG. 1 as in the first embodiment of the present invention. FIG. 5 shows a procedure of steps of a stamper making method in accordance with the present embodiment. In FIG. 1, element 3 is an argon laser; element 1 is a glass disk with a photoresist coated thereon; element 2 is a focusing lens for focusing the argon laser 3 on the photoresist disk; elements 4, 5, and 11 are mirrors for directing the beam; element 6 is a noise killer for removing noise caused by the laser output variations; element 7 is an optical intensity modulator; element 8 is an He-Ne laser for focusing controlling operation; elements 9 and 12 are polarization beam splitters; and element 10 is a sensor for effecting a focus error signal detecting operation.

A stamper making method in accordance with the present embodiment is described hereinafter. As shown in FIG. 5, a photoresist disk 1 is made by coating with a spinner after a positive type photoresist had been dropped upon the abrasion worked and washed glass disk. The method of cutting the photoresist disk 1 comprises the steps of: directing the laser beam 14 from the argon laser 3 of the laser cutting apparatus using mirrors 4 and 5; removing the noise and setting the intensity with the noise killer 6 and the optical strength modulator 7; thereafter directing the beam by the mirror 11, and passing the beam through the polarization beam splitter 12, and focusing it on the photoresist disk 1 with the focusing lens 2, thereby effecting a cutting operation. The track pitch is 1.3 μm. The laser beam intensity is set so that the depth of the pit is 130 nm when the prepit portion is cut. A detecting operation to determine whether or not the prepit is formed on the adjacent internal peripheral side is effected on the land plane adjacent onto the internal peripheral side of the prepit portion. A laser beam intensity of 15% of that used for the cutting of the prepit is set when the prepit is not formed on the internal peripheral side track. The laser beam is applied on the land plane in a position of approximately 0.65 μm (the center of the track with the prepit being formed on it) on the internal peripheral side with respect to the prepit.

Figure 17B:
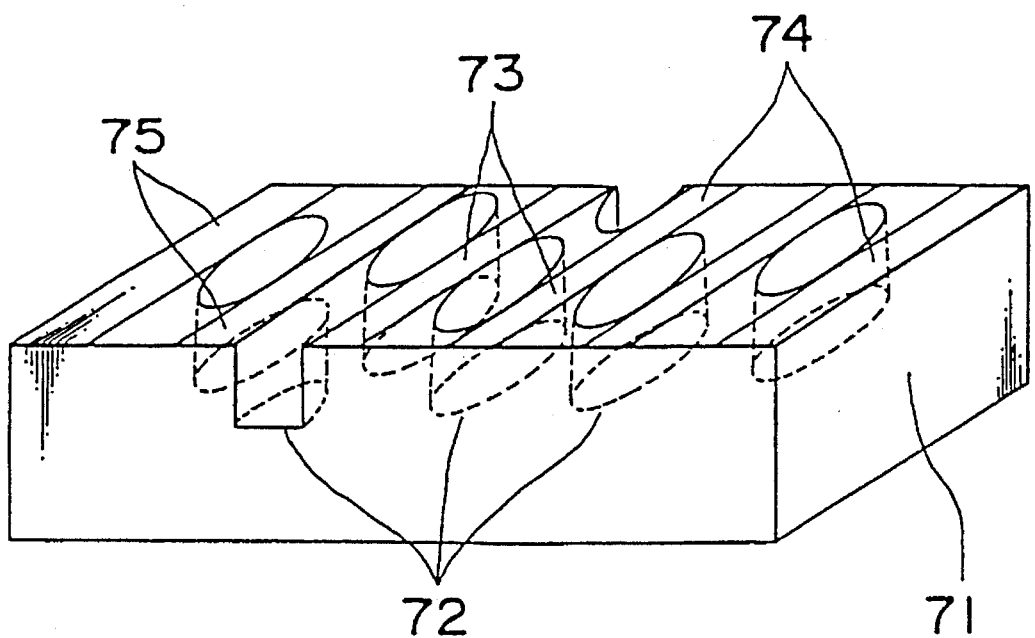

As the photoresist disk 1 cut in this manner is melted in the exposed portion when a developing operation is effected, the land plane 47c where the prepit is not formed in the internal peripheral track with respect to the prepit portion 47b of the photoresist disk 1 is adapted to be lower than the land plane 47d on the external peripheral side of the prepit and the land plane 47a of the prepit adjacent portion. The conductive film of the nickel is formed on the resist layer by sputtering and is conducted on the surfaces on the developed disk 47. An energizing operation is effected in a sulfamine acid nickel bath, nickel 46 is separated on the glass disk so as to effect an electrotyping operation, a coming off processing operation from the glass disk, and a washing operation are effected so that a stamper can be made. The stamper 41 made in this manner is adapted to be deeper in the land plane 44 on the external peripheral side of the prepit and the land plane 44 of the prepit adjacent portion than the land plane 47 where the prepit is not formed on the track on the internal peripheral side with respect to the prepit portion 42 for the reversion of the photoresist disk 47 and the unevenness. The land area, is as shown in FIG. 17(b), either of the region shown by lines 73, 74, and 75 adjacent to the prepit 72 of a plane disposed with tracks formed with the prepit 72 of the stamper 71 of the optical disk of a ROM type, or the regions on the stamper 41 corresponding to the land plane on the disk substrate.

Figure 6A:
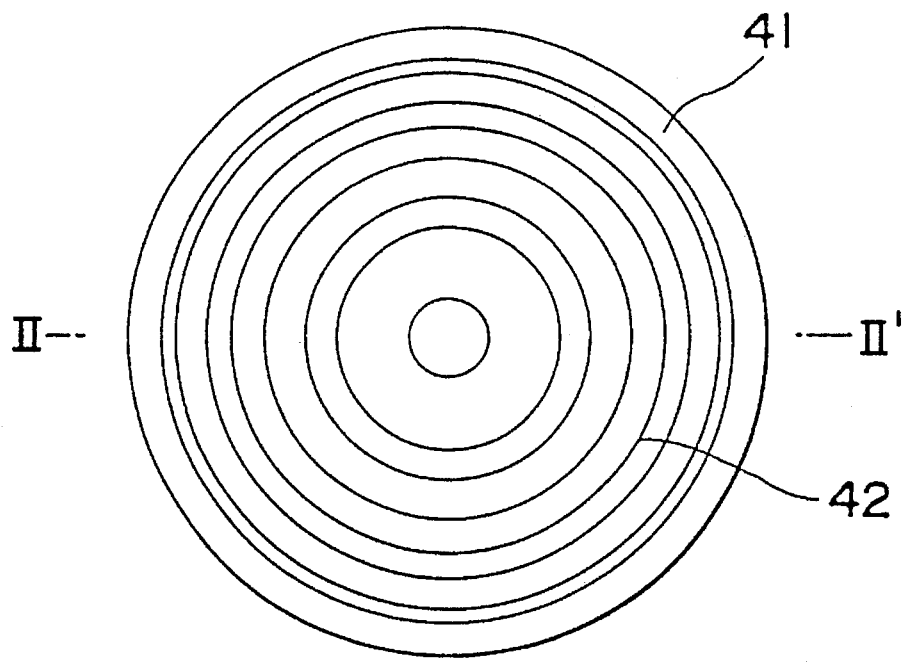
FIG. 6(a) a plan construction view of a stamper in accordance with the third embodiment of the present invention.
Figure 6B:
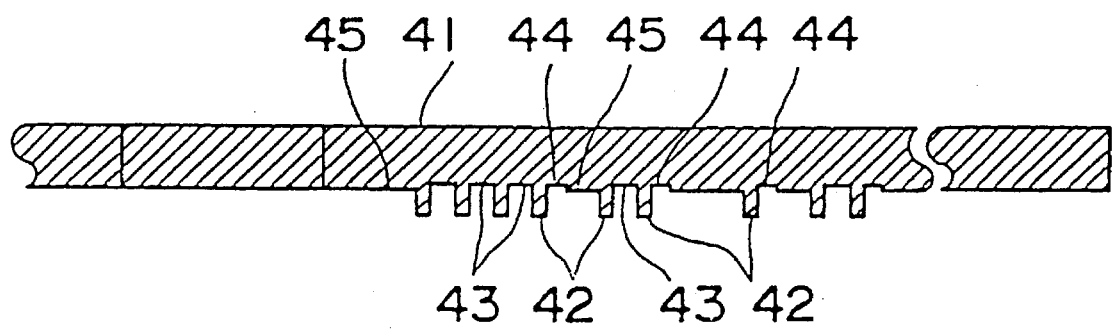
FIG. 6(b) is a view showing the sectional construction taken along a line II—II'.

FIG. 6(a) is a plan construction view, and FIG. 6(b) is a view showing the sectional construction taken along a line I—I' of a stamper in accordance with a third embodiment of the present invention. In FIGS. 6(a)–6(b), element 41 is a stamper; element 42 is a signal string of the prepits; element 43 is a land plane of an adjacent portion to the prepit 42; element 44 is a land plane on the external peripheral side with respect to the prepit 42; and element 45 is a land plane where the prepit is not formed in the internal peripheral side track with respect to the prepit portion 42. The stamper 41 of the present embodiment is deeper in the land plane 44 on the external peripheral side of the prepit and the land plane 43 of the prepit adjacent portion than the land plane 45 where the prepit is not formed in the internal peripheral side track with respect to the prepit portion 42 by a method of making using the above described photoresist disk. In the stamper 41 in the present embodiment, the depth of the land plane 44 on the external peripheral side from the prepit 42, and of the land plane 43 of the prepit adjacent portion are set to 150 nm. The depth of the land plane 45 where the prepit is not formed in the internal peripheral side track with respect to the prepit portion 42 is set to 135 nm.

When the stamper for making the optical disk substrate in the present embodiment is used, the stamper is set deeper by 15 nm in depth to the land plane 44 on the external peripheral side from the prepit 42 and the land plate 43 of the prepit adjacent portion than the land plate 45 where the prepit is not formed in the internal peripheral side track with respect to the prepit portion 42. When the disk substrate is made by an injection molding method of polycarbonate resin, the molten resin is likely to enter the land plane on the external peripheral side with respect to the prepit. The molded substrate can have the land planes on the internal peripheral side and the external peripheral external side in the diametrical direction made as approximately high as each other with respect to the prepit so that the right-left inequality of the prepits can be corrected.

The third embodiment of the present invention is a method of making a stamper for focusing a laser beam with a focusing lens so as to use the photoresist disk for effecting a laser cutting operation, of effecting developing, surface conduction, electrotyping, and coming off washing operations. The method is a method of making a stamper using a photoresist disk where the land plane not formed with a prepit on the internal peripheral side with respect to the prepit is lower than the land plane on the external peripheral side of the prepit and the land plane of the prepit adjacent portion by a focusing operation by a focusing lens upon the photoresist disk 1 of a laser beam having a laser beam intensity of 15% of that of a beam used for a cutting operation of the prepit, on the land plane in a position of approximately 0.65 μm on the internal peripheral side with respect to the prepit. The laser beam intensity applied to the land plane has only to be 10% through 30% in intensity with respect to the laser beam intensity applied to the prepit in accordance with the molding conditions of the substrate.

The third embodiment of the present invention is a method of making a stamper by applying a laser beam having an intensity of 15% to the land plane on the internal peripheral side of approximately 0.65 μm with respect to the prepit in the cutting of the prepit, using a photoresist disk where the land plane not formed with the prepit in the internal peripheral side track with respect to the prepit is lower than the land plane on the external peripheral side of the prepit and the land plane of the prepit adjacent portion. When the track pitch is set smaller, the position and the intensity of the land plane for applying the laser beam have only to be set in accordance with the size of the track pitch.

The stamper in the third embodiment of the present invention is a stamper adapted to set greater in depth to the land plane 44 on the external peripheral side from the prepit 42 and to the land plane 43 of the prepit adjacent portion than the depth of the land plane 45 where the prepit is not formed in the internal peripheral side track with respect to the prepit portion 42. The difference of the depth between the land plane on the external peripheral side and the land plane of the internal peripheral side with respect to the prepit has only to be 10 nm through 50 nm in accordance with the injection position and the flowing direction of the molten region.

A method of making an optical disk substrate in accordance with one embodiment of the present invention is described hereinafter with reference to the drawings.

Figure 7:
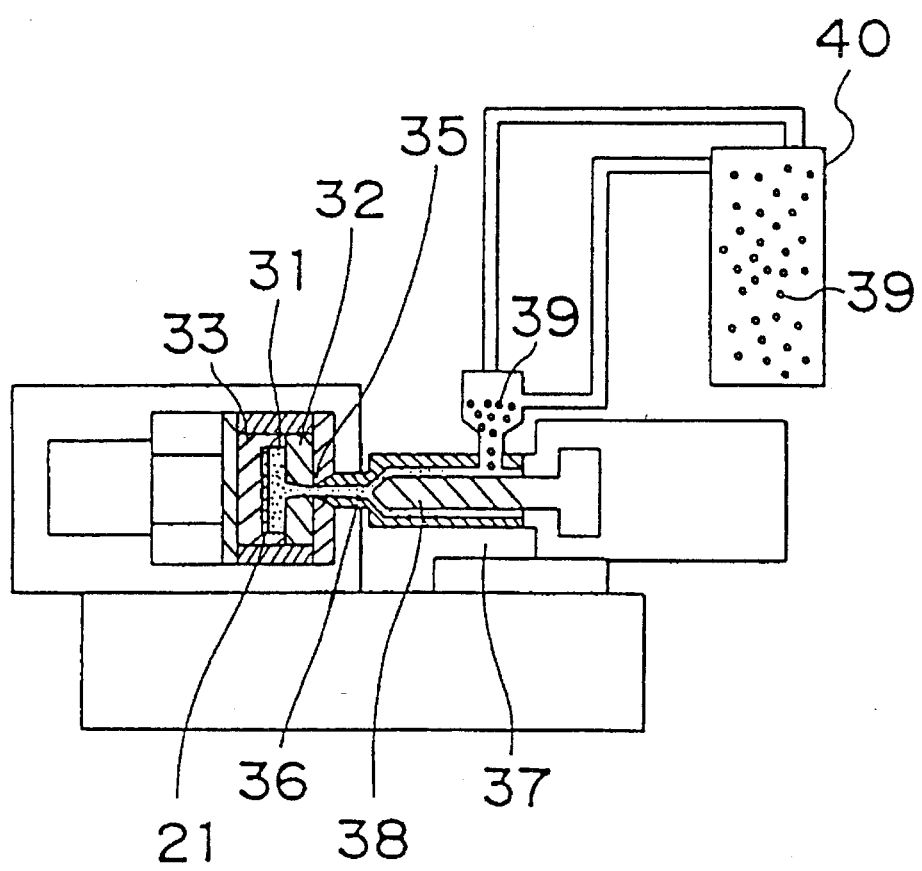
FIG. 7 is a construction view of an injection molding apparatus for making an optical disk substrate in accordance with an embodiment of the present invention.

FIG. 7 shows the construction view of an injection molding apparatus of an optical disk substrate in accordance with one embodiment of the present invention. In FIG. 7, element 31 is a cavity (production portion) where the polycarbonate is injected and molded as an optical disk substrate; element 32 is a fixed metallic mold; element 33 is a movable metallic mold; element 21 is a stamper for forming a groove, 1.5 μm in pitch, of a spirally shaped tracking guide, and prepit signals, and is retained in the mold metallic mold 33; element 35 is a nozzle for feeding the polycarbonate resin; element 36 is a molten resin of polycarbonate; element 37 is a heating cylinder for melting the polycarbonate resin; element 38 is a screw for effecting a molten resin injecting operation; element 39 is a pellet of the polycarbonate; element 40 is a drying apparatus of a pellet 39 of the polycarbonate.

A method of making disk substrates using the injection molding apparatus is described hereinafter. The pellet 39 of the polycarbonate in a drying apparatus 40 is fed to the heating cylinder 37. The molten resin 36 of the polycarbonate heated within the heating cylinder 37 is injected as is high in temperature at a high speed from the internal peripheral side between the fixed metallic mold 32 and the movable metallic mold 33 through the nozzle 35 for the resin feeding use with a screw 38 for the molten resin injection use, and is filled into the cavity 31. The injecting step is a step where the resin is filled into the cavity 31 through the pressure retaining region from the speed region of the high speed injection. An injection compressing step is a step of cooling the molten resin, compressing it with the fixed metallic mold 32 and the movable metallic mold 33, while adjusting the pressure retaining region of the injecting step in the timing. The cooling and molding operations are completed; thereafter, the movable metallic mold 33 is separated from the fixed metallic mold 32 so as to take out the optical disk substrate of the polycarbonate. In the method of making the optical disk substrate of the present embodiment, a stamper 21 is mounted in the movable metallic mold 33. The stamper where the land plane on the external peripheral side is set deeper by 20 nm than the land plane on the internal peripheral side with respect to the prepit of the same construction as the stamper shown in FIG. 4. The molten polycarbonate becomes smaller in amount to enter the land plane on the external peripheral side than the land plane on the internal peripheral side with respect to the prepit from the relationship among the compressing pressure of the injection compressing step, the viscosity of the molten polycarbonate, and the height of the prepit. An optical disk substrate in which the land plane on the internal peripheral side is approximately the same in height as the land plane on the external peripheral side with respect to the prepit can be molded with a stamper adapted to be deeper in the land plane on the external peripheral side. As a result, a method of making superior optical disk substrates can be realized where the signals of the tracking grooves and prepits can be sufficiently transferred, the servo characteristics at the recording and reproducing time and recording and reproducing characteristics are not lowered or errors or the like are not caused, because the identification of the sectors and the addresses cannot be effected.

The optical disk substrate in accordance with one embodiment of the present invention will be described hereinafter with reference to the drawings.

Figure 8:
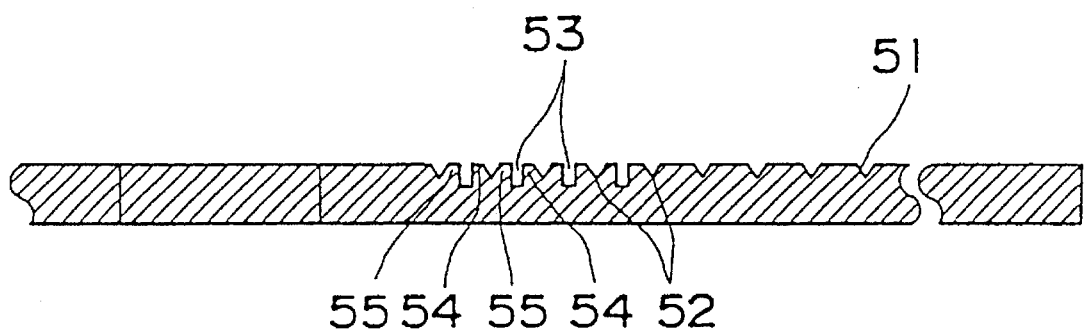
FIG. 8 is a cross-sectional view of an optical disk substrate provided with prepits and grooves in accordance with an embodiment of the present invention.

FIG. 8 is a cross-sectional view of an optical disk substrate with prepits and grooves being provided in it in accordance with the embodiment of the present invention. In FIG. 8, element 51 is an optical disk substrate of polycarbonate; element 52 is a groove, element 53 is a prepit, and elements 54 and 55 are land planes at the positions shown in the drawings. As shown in FIG. 8, the optical disk substrate in the present embodiment can realize the disk substrate where the difference in the height of the land plane adjacent to the prepit is 10 nm or lower.

Figure 9:
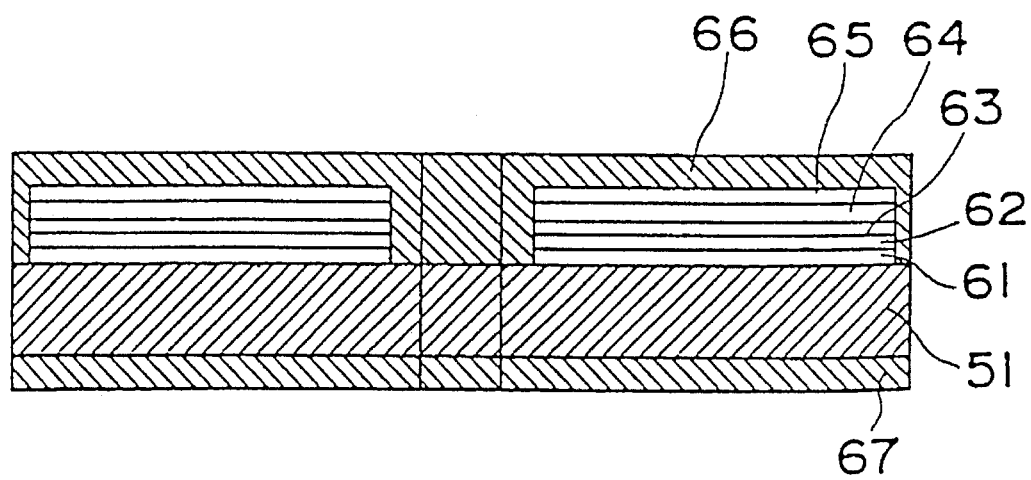
FIG. 9 is a construction view of an optical disk provided with prepits and grooves in accordance with the embodiment of the present invention.

FIG. 9 is a cross-sectional view of an optical disk constructed on the employment of an optical disk substrate in the embodiment of the present invention. In FIG. 9, the optical disk used with the disk substrate 51 is provided with a recording film 62 on the disk substrate through a dielectric film 61, and a protective film 65 on the recording film 62 through an intermediate dielectric film 63 and a reflection film 64. There provide an over-coat layer 66 of UV hard resin on the protective film 65, and an hard coat layer 67 coated on the side of inputting the light beams in order to protect the surface of the optical disk substrate.

Figure 10:
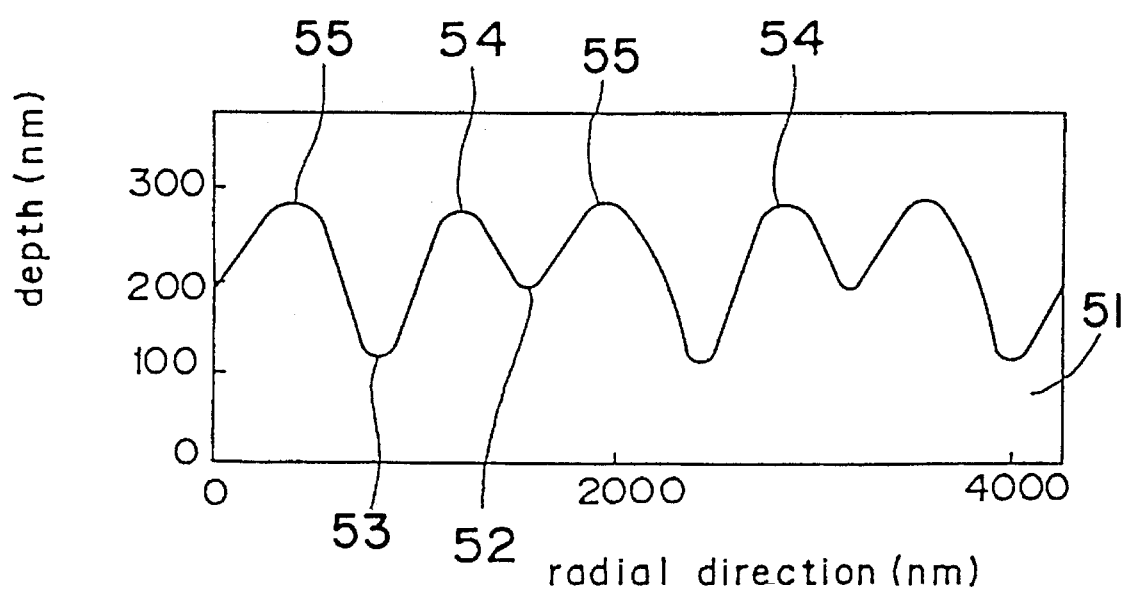
FIG. 10 is a sectional view of an optical disk substrate observed with a scanning tunnel microscope (STM) molded with a method of making an optical disk substrate in accordance with an embodiment of the present invention.

A sectional view of the optical disk, observed with the STM, provided with grooves and prepits made by a method in accordance with the present embodiment is shown in FIG. 10. The stamper 21 used for making the optical disk substrate of the present embodiment is set deeper by 20 nm in the land plane on the external peripheral side than the land plane on the internal peripheral side with respect to the prepit with 130 nm in the depth from the land plane on the internal peripheral side with respect to the prepit, with 1.5 μm in track pitch, 150 nm in the depth from the land plane on the external peripheral side, and 60 nm in the depth of the groove as shown in FIG. 4. When the disk substrate is molded using a material of 13,000 in average molecular weight of the polycarbonate, the molten resin is likely to enter the land plane 54 on the external peripheral side with respect to the prepit, so that the difference in height between the land plane 53 on the internal peripheral side and the land plane 54 on the external peripheral side may be within approximately 5 nm with respect to the prepit.

Figure 11:
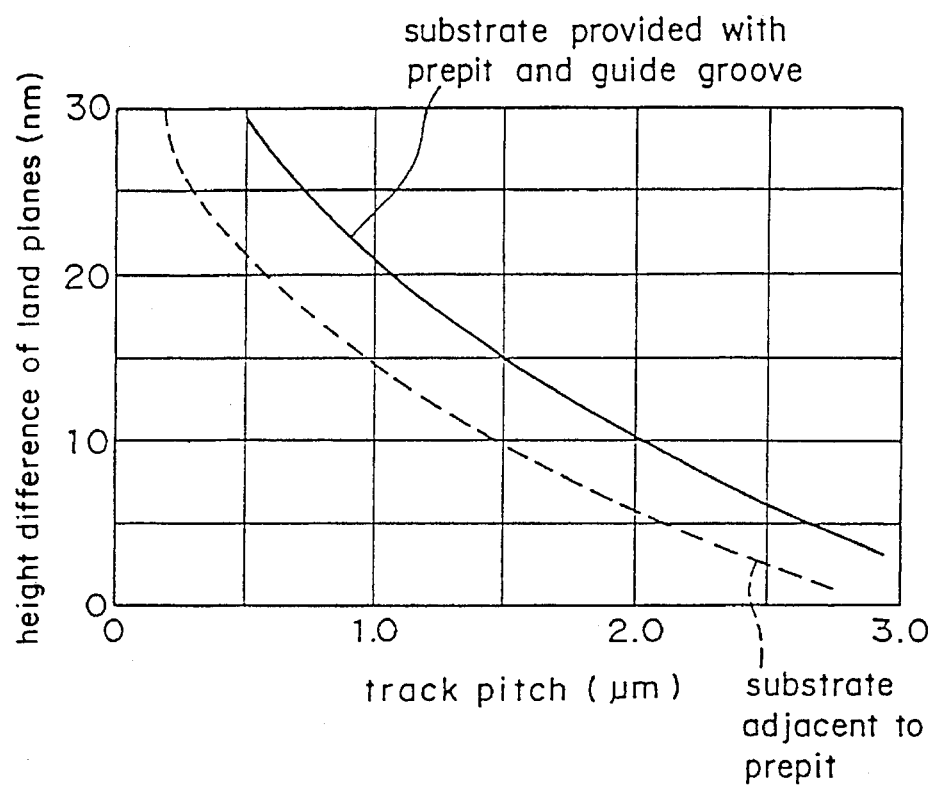
FIG. 11 is a graph showing the relationship of the height difference of the track pitch and the land plane of the conventional optical disk substrate.

FIG. 11 shows the relationship between the track pitch and the difference between the track pitch and the height of the land plane adjacent to prepits. In FIG. 11, the solid line shows an optical disk substrate having a construction of forming a guide groove and a prepit, while the dotted line shows an optical disk substrate adjacent to the track formed with prepits. As the track pitch becomes narrow, the difference in height between the land plane of the internal side and the land plane of the exterior side becomes large. The optical disk substrate formed with a guide groove and a prepit is provided with a prepit among the guide grooves, and, in the case of the track pitch of the guide grooves being less than 1.5 μm, an optical disk substrate constructed of the tracks formed with prepits adjacent to the others provided with track pitch of less than 1.3 μm causes a problem in that the difference between the height of the adjacent land planes becomes more than 10 μm. If the copying work is forced to be effected without consideration of the case of the compressing pressure during injection being quite large, it generates a problem concerning the mechanical property upon increasing the eccentric acceleration or the amount of tilt.

As a result, it causes problems during recording and reproducing or servo problems during recording and reproducing, or other problems of it being difficult to recognize the sectors and addresses in the case of copying the prepits and guide grooves. By the manufacturing method of the present invention, it becomes easier to convey the melted resin onto the land plane at the exterior side against the prepits during the forming of disk substrate so that it can have the same height within 5 nm of the formed substrate, which is a difference between the land plane of the exterior side and the land plane of the interior side with respect to the prepit.

Figure 12:
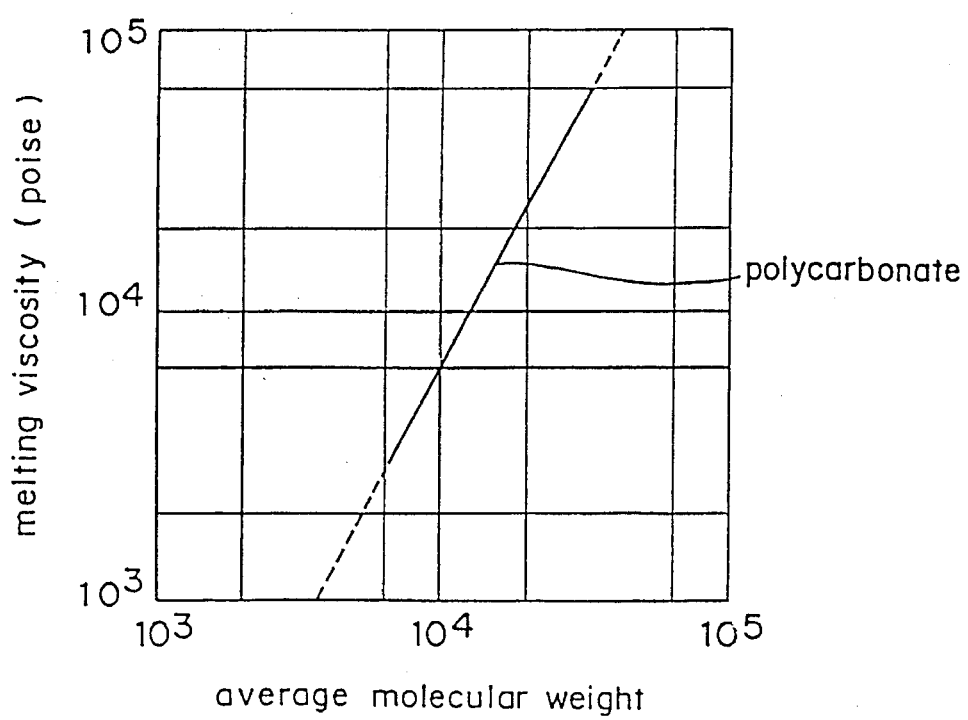
FIG. 12 is a graph showing the relationship between the average molecular weight and the melting viscosity of a material for molding the optical disk substrate.

FIG. 12 shows the relationship between the average molecular weight of the polycarbonate and the melting viscosity at 260° C. at the resin temperature. As shown in FIG. 12, the polycarbonate has a lower melting viscosity when the average molecular becomes smaller. The polycarbonate which becomes smaller than the 10000 in average molecular weight becomes as small as 5000 poise or less in melting viscosity. The resin is likely to flow into right, left unevenness of the prepit so as to improve the transfer property. Polycarbonate of 10000 or more in average molecular weight is required to be used, because impact strength is smaller as an optical disk substrate. An optical disk substrate which is approximately as high as 5 nm in the difference between the land plane on the internal peripheral side and the land plane on the external peripheral side with respect to the prepit can be realized by an optical disk substrate in an embodiment using a polycarbonate of 10000 or more in average molecular weight and the method of making. If the height difference between the land plane on the internal peripheral side and the land plane on the external peripheral side with respect to the prepit is 10 nm or less, an optical disk substrate which is not lowered in the servo characteristics during the recording and reproducing time and the recording and reproducing characteristics or errors and so on are not caused, because the sector and the address cannot be discriminated.

Figure 13:
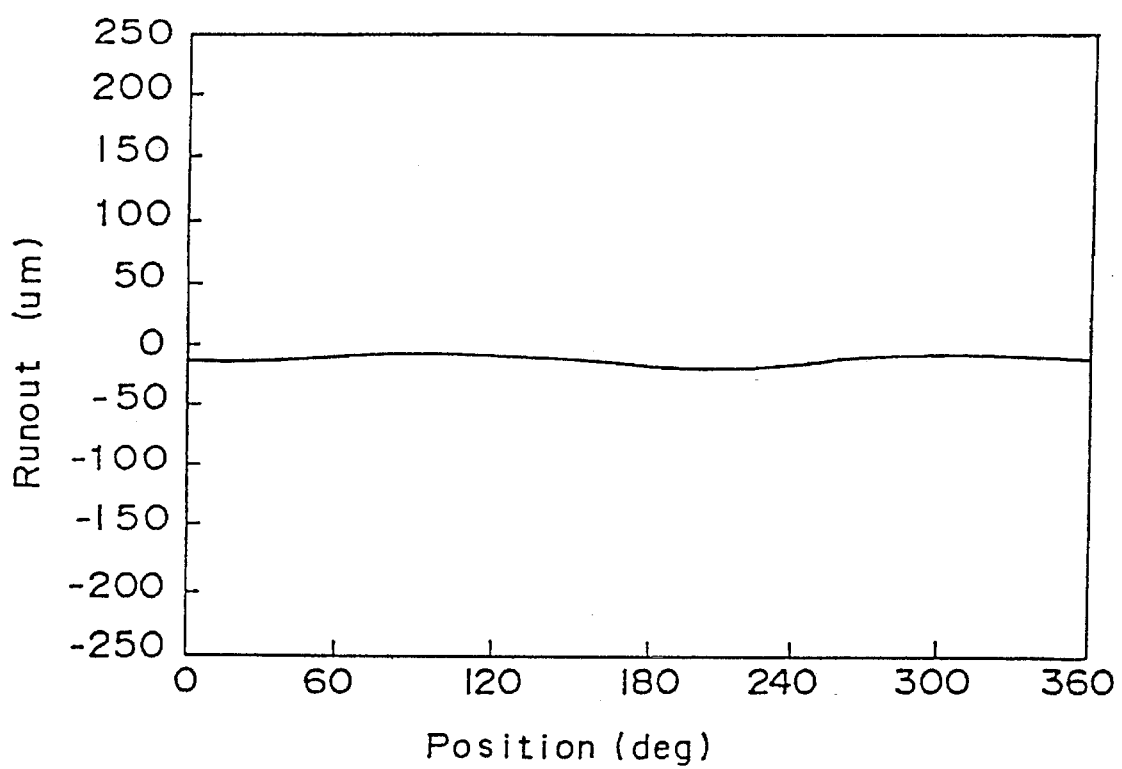
FIG. 13 is a measurement view of the mechanical characteristics of the optical disk substrate molded with a method of making an optical disk substrate in accordance with an embodiment of the present invention.
Figure 14:
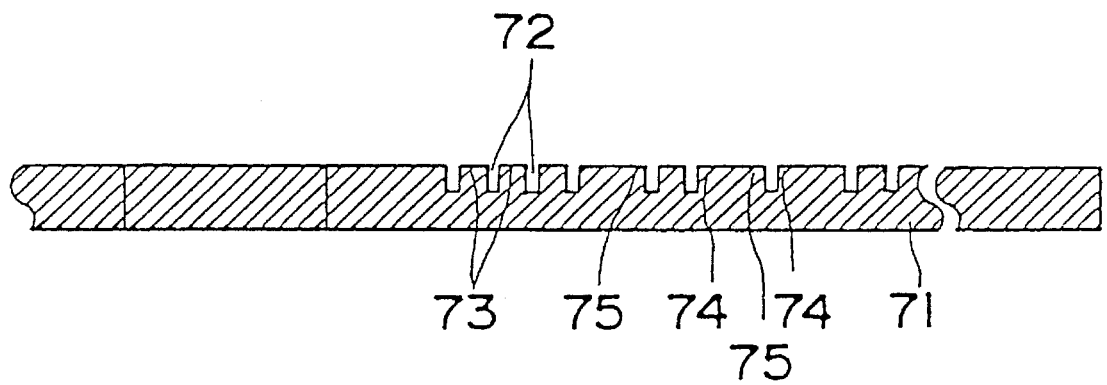
FIG. 14 is a construction view of an optical disk substrate constructed only with prepits in accordance with an embodiment of the present invention.
Figure 15:
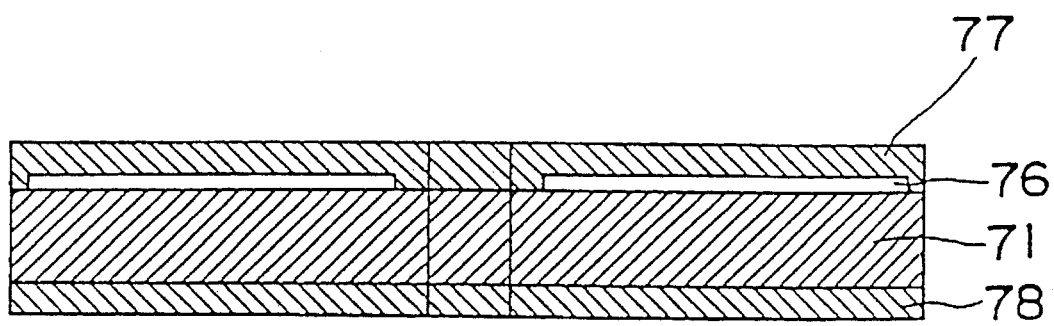
FIG. 15 is a construction view of an optical disk provided only with prepits in accordance with an embodiment of the present invention.
Figure 16A:
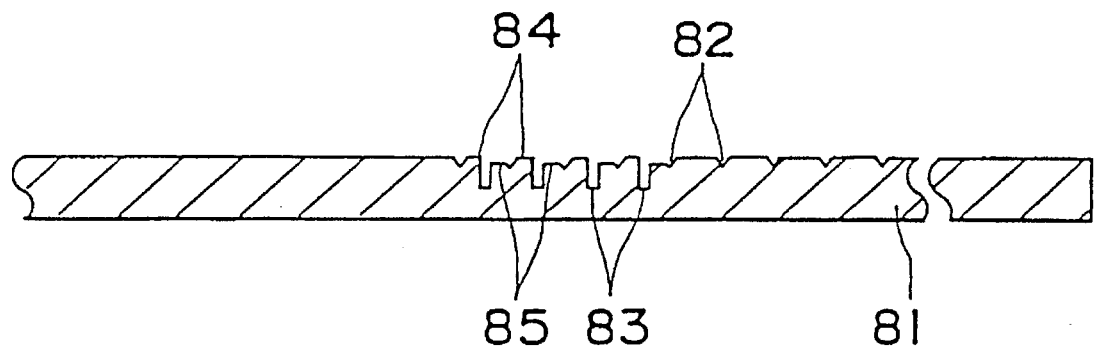
FIGS. 16(a)–16(b) show a conventional substrate.
Figure 16B:
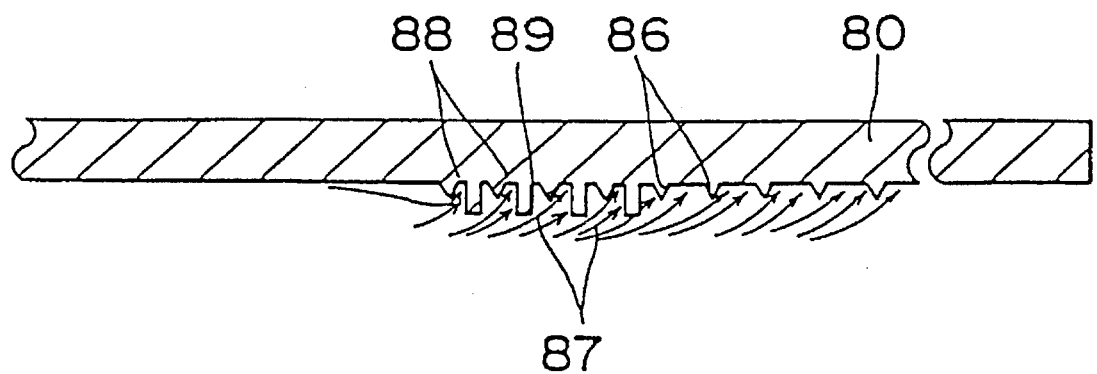

FIG. 13 shows the measured results of the mechanical characteristics of the optical disk substrate made by the method of making of the present embodiment. In FIG. 13, the lateral axis shows positions in the peripheral direction of the optical disk substrate, while the longitudinal direction is the shifting amounts of the disk substrate. Since it is not required to effect a transferring operation with larger compressing pressures at the injection time in the making operation of the optical disk substrate of the present embodiment, a substrate superior in mechanical characteristics having a tilt which is as small as 2 mrad or lower can be made.

Since the signals of the tracking grooves and the signals of the prepits can be sufficiently transferred, and the mechanical characteristics are superior, a superior optical disk substrate and a method of making it can be obtained which are not lowered in the servo characteristics and the recording and reproducing characteristics at the recording and reproducing time or errors and so on caused because of the sectors and addresses not distinguished are not caused.

The stamper is provided with prepits for transferring on the optical disk substrate, with the land plane on the external peripheral side being deeper than the land plane on the internal peripheral side with respect to the prepit. A stamper capable of sufficiently transferring on the optical disk substrate the tracking grooves and the prepits, a high quality optical disk substrate and a method of making it can be realized by a method of molding an optical disk substrate of a transparent plastic material with an injection molding method through the use of a fixed metallic mold and a movable metallic mold with the stamper being retained within.

In the present embodiment, a method of molding an optical disk substrate of polycarbonate is effected using the guide grooves and prepits for tracking guide of the optical spots. The stamper is provided with prepits. The stamper has only to be used which is changed in the depth of the land plane adjacent to the diametrical direction of the prepit of the stamper in a direction correcting the unevenness of the depth of the land plane adjacent to the diametrical direction of the prepit of the optical disk substrate.

In the present embodiment, a method of making the optical disk substrate by an injection molding apparatus with a fixed metallic mold, and a molding metallic mold with a stamper for forming the grooves and the prepits being retained in it is described. An injection molding apparatus with a stamper being retained in a fixed metallic mold may be used.

In the present embodiment, the optical disk substrate has only to be 5 nm in the height difference between the land plane on the internal peripheral side of the prepit and the land plane on the external peripheral side with the guides and prepits being provided for the tracking guide of the optical spots, and to be 10 nm or lower in the height difference between the land plane on the internal peripheral side of the prepit and the land plane on the external peripheral side with prepits being provided in it.

In the present embodiment, a making method of molding an optical disk substrate of polycarbonate is provided with the guide grooves and prepits for a tracking guide of the optical spots. Polyolefin or acrylic resin may be used as a transparent plastic material.

In the present embodiment, an optical disk substrate of polycarbonate of 10000 or more in average molecular weight provided with grooves for tracking guide of the optical spots has been described. The melting viscosity becomes 5000 poise or more of plastic materials if the polyolefin is of 15000 or more in the average molecular weight and an acrylic resin, so that the equivalent or more effects can be obtained.

In accordance with the present embodiment, a method of making a stamper comprises using a photoresist disk for focusing laser beams with a focusing lens so as to effect a laser cutting operation, effecting developing, surface conducting, electrotyping, and coming off washing operations. A method of making a stamper uses a photoresist disk for effecting a cutting operation and applies a laser beam on the land plane on the internal peripheral side with respect to prepits or applies the laser beam to the land plane, the beam being divided by the use of a x/4 plate so as to change the height of the land plane. Or a stamper is provided with prepits for effecting a transferring operation on the optical disk substrate, and is adapted to change the depth of the land plane adjacent to the diametrical direction of the prepit of the stamper. A stamper capable of sufficiently transferring on the optical disk substrate the tracking guide grooves and prepits, and a method of making it by an optical disk substrate molded with a transparent plastic material and an optical disk substrate superior with high quality of 10 nm or lower in the height difference of the adjacent land planes and a method of making it are obtained by an injection molding method using a fixed metallic mold and a movable metallic mold with the stamper being retained therein.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical disk substrate made of a molded transparent material and having a principle surface, said disk substrate comprising a plurality of prepits formed in said principle surface and spaced apart in a radial direction of said disk substrate, where the pitch is less than 1.3 µm.

2. An optical disk substrate made of a molded transparent material as recited in claim 1, further comprising:

tracking guide grooves disposed at regular intervals in a radial direction, said tracking guide grooves being disposed between adjacent grooves formed in a land plane.

3. An optical disk substrate as recited in claim 2, wherein each of said plurality of prepits is defined by a bottom surface, a first side wall extending from a first land portion of said principle surface to said bottom surface and an opposite second side wall extending from a second land portion of said principle surface to said bottom surface, said first and second land portions being aligned radially along said optical disk substrate, and wherein a difference between a first distance from said bottom surface to a plane of said first land portion in a direction normal to said principle surface and a second distance from said bottom surface to a plane of said second land portion in said direction normal to said principle surface is less than 10 µnm.

4. An optical disk substrate as recited in claim 1, wherein each of said plurality of prepits is defined by a bottom surface, a first side wall extending from a first land portion of said principle surface to said bottom surface and an opposite second side wall extending from a second land portion of said principle surface to said bottom surface, said first and second land portions being aligned radially along said optical disk substrate, and wherein a difference between a first distance from said bottom surface to a plane of said first land portion in a direction normal to said principle surface and a second distance from said bottom surface to a plane of said second land portion in said direction normal to said principle surface is less than 10 µnm.

5. The optical disk substrate as recited in claim 1, wherein the molded transparent material is a plastic having a melting viscosity of more than 5000 poise.

6. The optical disk substrate as recited in claim 1, wherein the molded transparent material is a polycarbonate having an average molecular weight of more than 10000.

7. The optical disk substrate as recited in claim 1, wherein the molded transparent material is a polyolefin having an average molecular weight of more than 15000.

8. An optical disk substrate made of a molded transparent material and having a principle surface, said disk substrate comprising a plurality of prepits formed in said principle surface and spaced apart in a radial direction of said disk substrate;

wherein each of said plurality of prepits is defined by a bottom surface, a first side wall extending from a first land portion of said principle surface to said bottom surface and an opposite second side wall extending from a second land portion of said principle surface to said bottom surface, said first and second land portions being aligned radially along said optical disk substrate, and wherein a difference between a first distance from said bottom surface to a plane of said first land portion in a direction normal to said principle surface and a second distance from said bottom surface to a plane of said second land portion in said direction normal to said principle surface is less than 10 μnm.

9. An optical disk substrate made of a molded transparent material as recited in claim 8, further comprising:

tracking guide grooves disposed at regular intervals in a radial direction, said tracking guide grooves being disposed between adjacent grooves formed in a land plane.

10. An optical disk substrate as recited in claim 8, wherein the plurality of prepits are spaced apart at a maximum pitch of 1.5 μm.

11. An optical disk substrate as recited in claim 9, wherein the plurality of prepits are spaced apart at a maximum pitch of 1.5 μm.

12. The optical disk substrate as recited in claim 8, wherein the molded transparent material is a plastic having a melting viscosity of more than 5000 poise.

13. The optical disk substrate as recited in claim 8, wherein the molded transparent material is a polycarbonate having an average molecular weight of more than 10000.

14. The optical disk substrate as recited in claim 8, wherein the molded transparent material is a polyolefin having an average molecular weight of more than 15000.

* * * * *